United States Patent [19]

Laudise

[11] 3,873,481

[45] Mar. 25, 1975

[54] PHTHALIC ANHYDRIDES ADDUCTS OF AMINO-AMIDES OF MONOMERIC FATTY COMPOUNDS

[75] Inventor: Michael A. Laudise, Spring Lake Park, Minn.

[73] Assignee: General Mills Chemicals, Inc., Minneapolis, Minn.

[22] Filed: May 10, 1973

[21] Appl. No.: 359,170

[52] U.S. Cl. ........ 260/18 PN, 260/18 N, 260/18 PF, 260/404.5, 260/830 P
[51] Int. Cl. ............................................ C08f 19/14
[58] Field of Search........ 260/18 PF, 830 P, 29.2 N, 260/404.5, 18 N, 18 PN

[56] References Cited
UNITED STATES PATENTS

| 2,970,971 | 2/1961 | Katz et al. | 260/18 |
| 3,035,000 | 5/1962 | Fulmer | 260/404.5 |
| 3,138,566 | 6/1964 | Arnold | 260/18 |
| 3,383,391 | 5/1968 | Carlick et al. | 260/18 |
| 3,522,270 | 7/1970 | Glaser | 260/18 |

FOREIGN PATENTS OR APPLICATIONS

| 701,209 | 1/1965 | Canada | 260/18 |

Primary Examiner—Eugene C. Rzucidlo
Attorney, Agent, or Firm—Anthony A. Juettner; Patrick J. Span; Norman P. Friederichs

[57] ABSTRACT

Adduct of a phthalic anhydride and an amino-amide of monomeric, epoxidized fatty compounds, which is a new curing agent for epoxy resins, particularly suitable for curing such epoxy resins in aqueous systems. The agents find utility in cement extended systems such as floorings, i.e. terrazo flooring, but are also useful in any area where thermoset epoxy systems find utility, such as coating systems, i.e. paints.

13 Claims, No Drawings

PHTHALIC ANHYDRIDES ADDUCTS OF AMINO-AMIDES OF MONOMERIC FATTY COMPOUNDS

This invention relates to new curing agents for epoxy resins which are particularly suitable or adapted for curing such epoxy resins in aqueous systems. The curing agents are adducts or reaction products of a phthalic anhydride compound and certain amino-amides of monomeric epoxidized fatty compounds. When used in curing epoxy resins in aqueous systems, the curing agents provide for improvement in either flow and leveling, dry time, pot life, chemical resistance and/or amine carbonation. The agents find utility particularly in cement extended systems such as floorings, i.e. terrazo floorings, but are useful in any areas where thermoset epoxy systems find utility, such as, coating systems, i.e. paints, adhesives or binders, fillers, etc.

BACKGROUND OF THE INVENTION

Thermosetting epoxy resin-amine curing agent systems have been known for some time. Amino-polyamide resins of polymeric fat acids are one type of known curing agent as can be seen from U.S. Pat. No. 2,379,413. The use of such resins for curing epoxy resins in aqueous systems is shown in U.S. Pat. No. 2,899,397. Such systems had some inherent disadvantages. More recently, monoepoxide adducts of such resins were disclosed as providing for improved properties in aqueous systems as shown in Canadian Pat. No. 875,618. In U.S. Pat. No. 3,127,365 are shown acrylic adducts of such polymeric fat acid polyamides using relatively large amounts of acrylic compound, which when saponified is said to provide a water soluble polymer. When used in curing epoxy resins, the compounds are used in 100% solid coatins and not in aqueous systems. Attempts to use such products in aqueous systems with epoxy resin were not particularly satisfactory.

Amino-amides of monomeric fatty compounds are also known as curing agents for epoxy resins. These are generally employed in 100% solid systems or in organic solvent systems. Such amino-amides, of particularly low viscosity, from expoxidized fatty acids or esters may be seen from U.S. Pat. No. 3,138,566. These low viscosity products are achieved by either direct epoxidation to a low oxirane oxygen level or diluting or cutting back a high oxirane material with unepoxidized fatty acid monomer to give the required oxirane oxygen content. Higher viscosity similar products can be seen in Canadian Pat. No. 616,324. These are also disclosed in Canadian Pat. No. 659,406. In this latter patent there are also disclosed the amino-amides of unmodified fatty acids. An extensive listing of methods of preparing the epoxidized fatty acids or esters, from which the amino-amides may be prepared can be found in U.S. Pat. No. 2,956,067. Amino-amides of epoxidized fatty oils, as well as the acids or other esters may also be seen in British Pat. No. 811,797. In some examples, the product is then reacted with phthalic anhydride. The reaction is conducted in a nonaqueous system, apparently resulting in both carboxylic groups of the anhydride forming amide linkages with the amino amide. In the foregoing references the products may contain, in addition to the amine and amide group, some imidazoline groups or other imino linked forms. None of the products are disclosed for use in aqueous systems and when used therein are relatively unsatisfactory.

In view of recent ecological history, aqueous systems for curing epoxy resins have assumed greater importance in order to avoid the use of organic solvents which may result in air pollution to some degree. Attempts to use known curing agents in aqueous systems have been unsatisfactory to a large extent, as deterioration of the properties of the cured product results.

SUMMARY OF THE INVENTION

It has now been found however, that satisfactory results may be achieved from aqueous systems by the use of a curing agent which is an adduct of a phthalic anhydride and an amino-amide of a monomeric epoxidized fatty compound. The adduct is formed by reacting the anhydride with the amino-amide for a time sufficient to react the anhydride with the amino-amide. The adduction is generally conducted in the presence of water at elevated temperatures.

The starting amino-amides of the monomeric epoxidized fatty compounds for adduction are known compounds as noted earlier hereinabove. These are prepared by reacting a polyamine with a monomeric epoxidized fatty compound under conventional amidification conditions (100°–350°C.) using an excess of amine to provide relatively high amine number products.

The adduct curing agents may then be employed to cure epoxy resins in aqueous systems, such as aqueous flooring, paint, or other coating formulations. The resulting products will show relatively good gloss characteristics and chemical resistance. The formulations possess good flow and leveling, dry time and pot life. In general, amine curing agents for epoxy resins tend to react with carbon dioxide to form a surface haze generally referred to as amine carbonate formation and water appears to be a catalyst for carbonate formation. The curing agents of the present invention tend to show a reduction of amine carbonation.

DETAILED DESCRIPTION AND PREFERRED EMBODIMENTS

As indicated, the curing agent of this invention is the adduct of phthalic anhydride and an amino-amide of a mono-meric epoxidized fatty compound. Illustrative of the phthalic anhydrides which may be employed are phthalic anhydride and the full or partially hydrogenated forms thereof, such as hexahydrophthalic anhydride.

As noted earlier the amino-amides of the monomeric epoxidized fatty compounds, with which a phthalic anhydride is reacted, are known materials. The preparation of aminoamides from low oxirane containing epoxidized fatty acids may be seen in U.S. Pat. No. 3,138,566. Higher viscosity aminoamides prepared from epoxidized materials may also be seen in Canadian Pat. No. 616,324. In general, the epoxy fatty compounds may be prepared by any of the conventional well known methods for epoxidation, such as earlier described. One method of forming the epoxidized material is to react any of the various unsaturated fatty acids with peracetic acid at about room temperature. The peracetic acid may be preformed before the epoxidation step or formed in situ by any of the well known processes, involving sulfonic acid resins, utilizing hydrogen peroxide and acetic acid. Epoxation can also be preformed by the use of formic acid and hydrogen peroxide or by the addition of hypochlorous acid to the carbon-carbon double bond followed by dehydrochlorination. The epoxidized compound may be either an epoxidized, higher (8–22 carbon atoms) fatty acid, a lower alkyl (1–8 carbon atoms) ester thereof or the glycerides thereof, i.e. epoxidized oils.

Since viscosity is a factor in the areas of use of the products of the present invention, it is preferable to employ partially epoxidized materials, i.e. those having a lower oxirane oxygen content than the fully epoxidized material. This can be achieved as in U.S. Pat. No. 3,138,566 by diluting or cutting back a high oxirane oxygen content material with unepoxidized fatty acids to provide a lower average oxirane oxygen content mixture. In general, it is preferred that the average oxygen content of the partially epoxidized material or mixture of monomeric fatty acid with highly epoxidized material be less than 6% by weight. A desirable range is from 1–6%, and more preferably 3.5–5.5% oxirane oxygen content.

The monomeric fatty compounds which are employed for mixing with or dilution of the highly epoxidized compounds may be the naturally occurring higher (8–22 carbon atoms) fatty acids generally described as being monomeric, aliphatic hydrocarbon, monocarboxylic acids having from 8–22 carbon atoms, and more desirably 16–20 carbon atoms. As with the epoxidized materials, the lower alkyl esters (1–8 carbon atoms) thereof may be employed in place of the acids in which case, during the amidification reaction the by-product is an alcohol instead of water. The most commonly available fatty acids are those containing 18 carbon atoms, such as oleic and linoleic, mixtures of which are found in tall oil fatty acids in substantially equal amounts. Accordingly, tall oil fatty acids or the individual oleic and linoleic acids are usually employed. The fatty acids may be saturated or unsaturated.

The amino-amides of the monomeric epoxidized fatty compounds are prepared by reaction of an amine component, generally a diamine or higher polyamine with a monomeric fatty compound. The conditions of reaction are well known and can be seen from the patents noted earlier. In general, this involves reaction at temperatures in the range of 100°C.–350°C., preferably 150°–310°C., for from 1 to 6 hours. In general, the amine component will be an alkylene/polyamine, as these are generally commonly available. Accordingly, the amine component may be represented by the general formula $$H_2N\ R'(NHR')_p NH_2$$

where R' is an alkylene radical generally having from two to six carbon atoms and p is a positive integer generally less than 6. Illustrative polyamines are diethylene triamine, tri-ethylene tetramine, tetraethylene pentamine, di-1,3-propane triamine, tri-1,3-propane tetramine, di-1,2-propane triamine, bis(hexamethylene) triamine and the like. Thus, the alkylene radical in the above formula is generally ethylene but is not necessarily limited thereto.

The amino-amide resins generally have relatively high amine numbers on the order of about 150–700 and preferably on the order of 300–600. This is generally achieved by reacting an excess of amine over the acid and oxirane present. Thus, the amine is added in sufficient amount to provide the desired amine number of the amino-amide resin. As the presence of amine is necessary for curing of the epoxy resins, the product, after adduction with a phthalic anhydride, will still have sufficient amine groups present in order to cure epoxy resin. The amine number will generally be lower for the adduct than was present in the amino-amide resin prior to adduction with the active acrylic compound. Generally the adducts will have amine numbers in the order of about 100–600 and more preferably be about 200–500.

The adduct is formed by reacting the anhydride in an amount of about 0.04–0.4 moles per equivalent of amine in said amino-amide, and preferably about 0.05 to 0.2 moles. By equivalent of amine in said aminoamide is meant the equivalent weight of amino-amide, or the weight of amino-amide to provide one amine group for reaction. This may be determined from the amine number of the amino-amide by dividing 56100 by the amine number. Thus:

Equivalent weight = 56100/Amine No.

The amine number is the number of milligrams of KOH equivalent for free amine groups in 1 gram sample of resin.

The reaction of the anhydride and the amino-amide is conducted in the presence of water at substantially room temperature or elevated temperature. The reaction is an exothermic one. With the presence of the water, at room temperature it may be necessary to apply gentle heat to initiate the reaction which then continues due to the exothermic nature thereof. It is, however, preferred that elevated temperatures of 50°C. and above be maintained. It is, of course, preferable not to exceed the boiling point or decomposition point of any of the materials present during the reaction. The reaction being conducted in the presence of water, it is therefore desirable that the reaction temperature not exceed 100°C.

As indicated above, the reaction of amino-amide and anhydride is conducted in the presence of water. By so doing the resulting product is an adduct of a phthalic anhydride and the amino-amide of the epoxidized compound wherein one of the carboxylic groups of said anhydride forms an amide linkage with said amino-amide and the second carboxylic group of said anhydride forms an acid salt linkage with said amino-amide. If no water is present the reaction product will form amide linkages at each carboxylic group of the anhydride and such products do not perform satisfactorily in the aqueous system desired. It is believed that the presence of both types of linkages, amide and acid salt, provides for the suitability of the products in aqueous systems for curing epoxy resins.

Generally in conducting the reaction of anhydride and amino-amide resin, the base resin is first dispersed in water prior to reaction with the anhydride. Generally the water dispersion of resin is such as to provide a dispersion comprising about 50–70%, preferably about 65%, by weight of resin in the dispersion.

As the curing agents are to be used in particular in aqueous epoxy resin systems thereby eliminating the necessity for use of any organic solvents the epoxy resin which may be used in this invention in aqueous form are the liquid epoxy resins. Such epoxy materials are of a wide variety. In general, they contain a plurality of epoxy groups capable of reaction with the curing agent.

The typical initially available epoxy materials are complex reaction products of polyhydric phenols with polyfunctional halohydrins providing resins having terminal epoxide groups. A large number of this type of epoxy resins are disclosed in Greenlee U.S. Pat. Nos. 2,585,115 and 2,589,245. Typical polyhydric phenols useful in the preparation of epoxy resins include resorcinol and various bisphenols resulting from a condensation of phenol with aldehydes and ketones such as formaldehyde, acetaldehyde, acetone, methyl ethyl ketone, and the like. A typical epoxy resin is the reaction product of epichlorohydrin and 2,2-bis(parahydroxy phenyl) propane (Bixphenol A), the resin having the theoretical structural formula shown in U.S. Pat. No. 3,138,566 in which the integer n is 0 or a lower integer preferably 1 or less. As indicated in this patent, epoxy resins may be characterized further by reference to their epoxy equivalent weight, the epoxy equivalent weight of pure epoxy resins being the molecular weight of the resin divided by the mean number of epoxy radicals per molecule or in any case the number of grams of resin corresponding to one equivalent of epoxide. While certain specific epoxy resins which are the most readily available have been described, it is understood that the epoxy resinous compositions encompassed by this invention are those liquid epoxy resins having an epoxy equivalent weight of about 140–300, a preferred epoxy equivalent weight being about 185–220 expressed in terms of grams of compound per epoxy group. In general, epoxy resins having an epoxy equivalent weight above 300 are not suitable as such resins are solid in form. However, any fluid or liquid epoxy resin will be suitable.

In order to reduce the pot life of the curing system (more rapid curing), there may optionally be employed along with the curing adduct other known curing agents for epoxy resins. In general the rapid curing agents are so employed. Among the preferred curing or hardening agents of this type are the alkylene polyamines, such as earlier defined above.

This invention can best be illustrated by reference to the following Examples in which all parts and percentages are by weight unless otherwise noted.

EXAMPLE 1

The base resin for this example is an amino-amide of an epoxidized fatty oil, i.e. epoxidized soy bean oil. The resin was prepared by reacting at 350°F. (175°C.) for 3 hours the following reactants in the amounts indicated.

|  | Weight (gms) | Equivalent % |
|---|---|---|
| Monomeric tall oil fatty Acids (eq.wt. 282) | 210.7 gms | 7.83 |
| *Epoxidized soybean oil (eq.wt. 313) | 328.3 gms | 11.01 |
| Triethylene tetramine (eq.wt. 36.5) | 282.5 gms | 81.16 |

*Typical average oxirane content - about 7%

The resulting amino-amide resin had an amine number of 381.3 and an acid number of 2.9.

After reaction the resin was cooled to 150°F. and 173.4 grams of water was added to 450 grams of resin. To the foregoing was then added 36.0 grams of phthalic anhydride and the reaction was continued for 5 hours at 150°F. To the resulting 659.4 grams there was added 32.4 grams of triethylene tetramine (TETA) which was mixed for 0.5 hours while maintaining a 150°F. temperature.

An analysis of the actual product and typical specification range for products of this type is as follows:

|  | Typical Range | Actual Value |
|---|---|---|
| Amine Value | 300–320 | 317.1 |
| Acid Value | 24–32 | 24.1 |
| Weight per Gallon | 8.3–8.6 | 8.5 |
| Color, Gardner | 4–7 | 4+ |
| % Water | 23.5–26.5 | 26.3 |

EXAMPLE 2

In the same manner as example 1, the base aminoamide resin was prepared from methyl epoxy stearate with the following reactants:

|  | Equivalents (eq.) | Weight % |
|---|---|---|
| Monomeric tall oil fatty acids | 0.249 | 25.4 |
| *Methylepoxy stearate (MES) | 0.35 | 40.6 |
| Triethylene tetramine (TETA) | 2.58 | 34.0 |

*Typical specification — 6.5 to 7.5% oxirane content (ave. about 7%)

The resulting amino-amide resin had the following properties:

| Amine No. | 382.2 |
|---|---|
| Acid No. | 2.96 |
| Viscosity at 50°C. | 44 poise |

In the same manner as Example 1, the temperature was reduced from 350°F. to 150°F. (65°C.) and water added to provide a mixture of 910 parts resin and 490 parts water. To this was added 140 parts of phthalic anhydride and an additional 75 parts of water after which the mixture was then heated for 5 hours at 150°F.

Analysis of the resulting product was as follows:

| Amine Number | 196.2 |
|---|---|
| Acid Number | 36.7 |
| Viscosity at 50°C. | 14.3 poise |

EXAMPLE 3

This example is a repeat of Example 2 except that only 98 parts of phthalic anhydride was employed and the additional added water was 92 parts. The resulting product had an amine number of 215.

EXAMPLE 4

The base amino-amide resin of Example 1 was prepared again. To 910 grams of this resin was added 490 grams of water. There was then added 140 grams of phthalic anhydride and 75 parts of water and the mixture was maintained at 150°F. for 5 hours.

Analysis of the resulting product was as follows:

| | |
|---|---|
| Amine No. | 220.7 |
| Acid No. | 39.8 |
| Viscosity at 50°C. | 14.1 poise |

EXAMPLE 5

Example 4 was repeated except for employing 98 parts of phthalic anhydride and 92 parts of added water. The analysis of the resulting product was as follows:

| | |
|---|---|
| Amine No. | 249.1 |
| Acid No. | 24.7 |
| Viscosity at 50°C. | 14.4 poise |

EXAMPLE 6

In order to evaluate the coating and flooring applications, the product of Example 1 was formulated in aqueous systems with an aqueous epoxy emulsion. The preformulated epoxy resin emulsion was prepared using the following materials:

| | Pounds |
|---|---|
| Water | 210.00 |
| $C_9H_{19}$ -⌬- $O(CH_2CH_2O)_{39}CH_2CH_2OH$ | 2.80 |
| Hydroxyethyl cellulose | 1.00 |
| Epoxy resin (a mixture of 79.4% of diglycidyl ether of bisphenol A having an epoxy equivalent weight of 190, 14% of an epoxidized aliphatic hydrocarbon mixture (12-14 carbon atoms) having an epoxy equivalent weight of 225 and 7% of polyoxyethylene (20) sorbitan monolaurate) | 212.00 |

EXAMPLE 7

The amino-amide product of Example 1 was then formulated with the preformulated epoxy emulsion of Example 6 in various coating formulations and evaluated. The formulations and evaluations were as follows:

| COATING A | |
|---|---|
| Ingredients | Grams |
| Epoxy Emulsion | 150.0 |
| Amino-amide | 42.8 |
| | 192.8 |

Mix ratio: 70 epoxy/30 Amino-amide based on solids
Coating solids: 55.5%
Flow and leveling: Brush evaluation - fair
Amine carbonation: visual inspection at 50% relative humidity 24 hour cure - slight
Gloss: 70° to 75°
Chemical resistance: 10% HCl
Spot test: fail 5 minutes 5% sodium hydroxide, fail 5 minutes.

| COATING B | |
|---|---|
| Ingredients | Grams |
| Epoxy Emulsion | 150.0 |
| Amino-amide | 53.9 |
| Water | 3.8 |
| | 207.7 |

Mix ratio: 65 parts epoxy/35 parts amino-amide based on solids
Coating solids: 55.5%
Flow and leveling: Brush evaluation - fair
Amine carbonation: Visual inspection at 50% relative humidity, 24 hours cure - fair
Gloss: 75° to 80°
Chemical Resistance: 10% HCl - fail 10 minute spot test — 5% sodium hydroxide-fail 10 minute spot test

| COATING C | |
|---|---|
| Ingredients | Grams |
| Epoxy Emulsion | 122.6 |
| Amino-amide | 59.5 |
| Water | 8.5 |
| | 190.6 |

Mix Ratio: 57.9 epoxy/42.1 amino-amide based on solids
Coating solids: 55.5%
Flow and Leveling: Brush evaluation - good
Amine carbonation: visual inspection at 50% relative humidity, 24 hours cure - good
Gloss: 85°–90°
Chemical Resistance: 10% HCl - fail 30 minute spot test 5% sodium hydroxide - fail 30 minute spot test

| COATING D | |
|---|---|
| Ingredients | Grams |
| Epoxy Emulsion | 150.0 |
| Amino-amide | 81.9 |
| Water | 13.6 |
| | 245.5 |

Mix Ratio: 55 parts of epoxy/45 parts amino-amide based on solids
Coating Solvents: 55.5%
Flow and Leveling: Brush evaluation - excellent
Amine carbonation: Visual inspection at 50% relative humidity, 24 hours cure - none
Gloss: 90+°
Chemical Resistance: 10% HCl, spot test - greater than 3 hours, no failure - 5% sodium hydroxide - greater than 3 hours, no failure

| COATING E | |
|---|---|
| Ingredients | Grams |
| Epoxy Emulsion | 150.0 |
| Amino-amide | 100.0 |
| Water | 20.0 |
| | 270.0 |

Mix Ratio: 50 parts of epoxy/50 parts of amino-amide based on solids
Coating Solids: 55.5%
Flow and Leveling: Brush evaluation, excellent Amine carbonation: Visual inspection at 50% relative humidity, 24 hours cure, slight amine carbonation.

EXAMPLE 8

In a similar fashion, the amino-amide product of Example 1 was formulated with the epoxy emulsion of Example 6 in a flooring application and evaluated. The formulation, procedures and results were as follows:

I. Formulation

| Ingredients | Grams |
| --- | --- |
| Epoxy Emulsion | 122.58 |
| Amino-amide | 66.80 |
| 40/30 mesh silica sand | 1,816.00 |
| Type 1 White Portland Cement | 853.52 |
| Water | 302.40 |

Mixing Procedure

The epoxy emulsion was mixed with the amino-amide at a slow speed until homogeneous. The cement and sand was premixed until homogeneous. The water was then added and mixed therewith until a smooth paste is formed. The premixed epoxy emulsion and amino-amide were then added and mixed until homogeneous.
Resin Mix Ratio: 55 parts of epoxy/45 parts of amino-amide
Compressive Values: 28 day cure under polyethylene film, 7,300 psi
Adhesion: Tensile lap shear 1,500 psi to dry concrete, 1,200 psi to wet concrete
Troweling: Visual inspection ¼ inch to 1 inch wedge - excellent
Leveling: Visual inspection ¼ inch to 1 inch wedge- excellent II. Control Formulation

| Ingredients | Grams |
| --- | --- |
| Type 1 White Portland Cement | 853.52 |
| 30/40 mesh silica sand | 1,816.00 |
| Water | 380.29 |

Mixing Procedure

The sand and cement were mixed together until homogeneous. The water was then added and mixed until smooth paste was formed.
Compression Values: 28 day cure under polyethylene film, 2,800 to 3,300 psi.
Adhesion: Tensile lap shear - 270 to 300 psi to dry concrete - 250-265 psi to wet concrete
Troweling: Visual inspection ¼ inch to 1 inch wedge - fair
Levelinng: Visual inspection ¼ inch to 1 inch wedge - fair.

The embodiments of the invention in which an exclusive property or privilege is claimed are defined as follows:

1. A process of preparing a phthalic anhydride adduct of an amino-amide of an epoxidized fatty compound comprising dispersing in water an amino-amide of an epoxidized fatty compound having an amine number of about 150-700, adding to the resulting dispersion a phthalic anhydride in an amount of about 0.04-0.4 moles of anhydride per equivalent of amine in said amino-amide and reacting said amino-amide and said anhydride at a temperature below 100°C. to provide an adduct wherein one carboxylic group of said anhydride forms an amide linkage with said amino-amide and a second carboxylic group of said anhydride forms an acid salt with said amino-amide, said epoxidized fatty compound being selected from the group consisting of epoxidized fatty acids having from 8-22 carbon atoms, the alkyl esters thereof wherein the alkyl group contains from 1-8 carbon atoms, the glycerol esters thereof, and mixtures thereof with unepoxidized fatty acids having 8-22 carbon atoms so as to provide an oxirane oxygen content by weight of about 1-6%.

2. A process as defined in claim 1 wherein said anhydride is employed in an amount of about 0.05-0.2 moles.

3. A process as defined in claim 1 wherein said anhydride is phthalic anhydride.

4. A process as defined in claim 1 wherein said epoxidized fatty compound is methyl epoxy stearate.

5. A process as defined in claim 1 wherein said epoxidized fatty compound is epoxidized soybean oil.

6. An adduct particularly suitable for curing epoxy resins in aqueous systems of a phthalic anhydride and an amino-amide of an epoxidized fatty compound wherein one carboxylic group of said anhydride forms an amide linkage with said amino-amide and the other carboxylic group of said andydride forms an acid salt with said amino-amide, said epoxidized fatty compound being selected from the group consisting of epoxidized fatty acids having from 8-22 carbon atoms, the alkyl esters thereof wherein the alkyl group contains from 1-8 carbon atoms, the glycerol esters thereof, and mixtures thereof with unepoxidized fatty acids having 8-22 carbon atoms so as to provide an oxirane oxygen content by weight of about 1-6% said adduct being prepared according to claim 10.

7. An adduct as defined in claim 1 wherein said anhydride is phthalic anhydride.

8. An adduct as defined in claim 1 wherein said epoxidized fatty compound is methyl epoxy stearate.

9. An adduct as defined in claim 1 wherein said epoxidized fatty compound is epoxidized soybean oil.

10. An adduct as defined in claim 1 wherein said anhydride is employed in an amount of about 0.05-0.2 moles.

11. A cured composition of matter comprising the reaction product of the adduct defined in claim 6 and a liquid epoxy resin having an epoxy equivalent weight of about 140-300.

12. A cured composition as defined in claim 11 in which said epoxy resin in a polyglycidyl ether of a polyhydric phenol.

13. A cured composition as defined in claim 12 in which said polyhydric phenol is 2,2-bis(parahydroxy phenyl) propane.

* * * * *

UNITED STATES PATENT OFFICE
CERTIFICATE OF CORRECTION

Patent No. 3,873,481      Dated March 25, 1975

Inventor(s) Michael A. Laudise

It is certified that error appears in the above-identified patent and that said Letters Patent are hereby corrected as shown below:

Col. 1, line 37 "coatins" should read - coatings -

Col. 1, line 45 "expoxidized" should read - epoxidized -

Col. 9, line 54 "Levelinng" should read - Leveling -

Col. 10, line 42 "claim 1" should read - claim 6 -

Col. 10, line 44 "claim 1" should read - claim 6 -

Col. 10, line 46 "claim 1" should read - claim 6 -

Col. 10, line 48 "claim 1" should read - claim 6 -

Signed and Sealed this twenty-eight Day of October 1975

[SEAL]

Attest:

RUTH C. MASON
*Attesting Officer*

C. MARSHALL DANN
*Commissioner of Patents and Trademarks*